E. J. THURBER & J. W. RACKLYEFT.
VALVE MECHANISM.
APPLICATION FILED DEC. 17, 1914.
1,271,805.
Patented July 9, 1918.
2 SHEETS—SHEET 1.
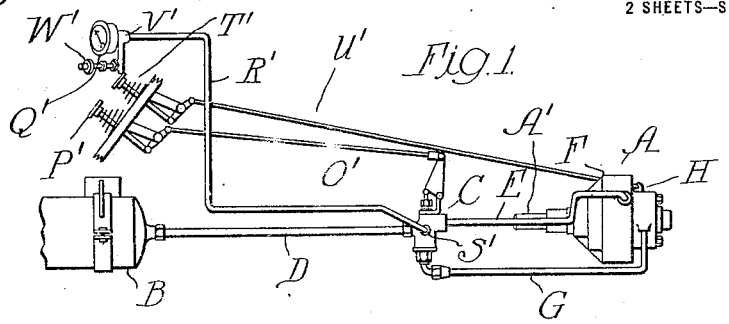
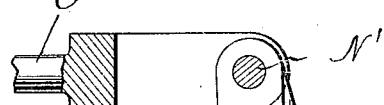
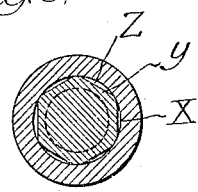
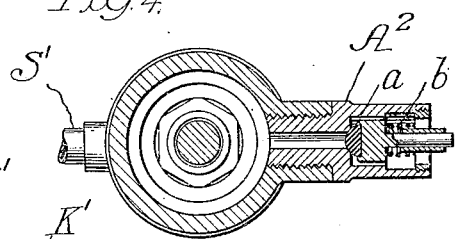
Witnesses
E. R. Barrett
James P. Barry
Inventor
Edward J. Thurber
John W. Racklyeft
By Whitman Wilkinson Whitman
Attorney E. J. THURBER & J. W. RACKLYEFT.
VALVE MECHANISM.
APPLICATION FILED DEC. 17, 1914.
1,271,805.
Patented July 9, 1918.
2 SHEETS—SHEET 2.
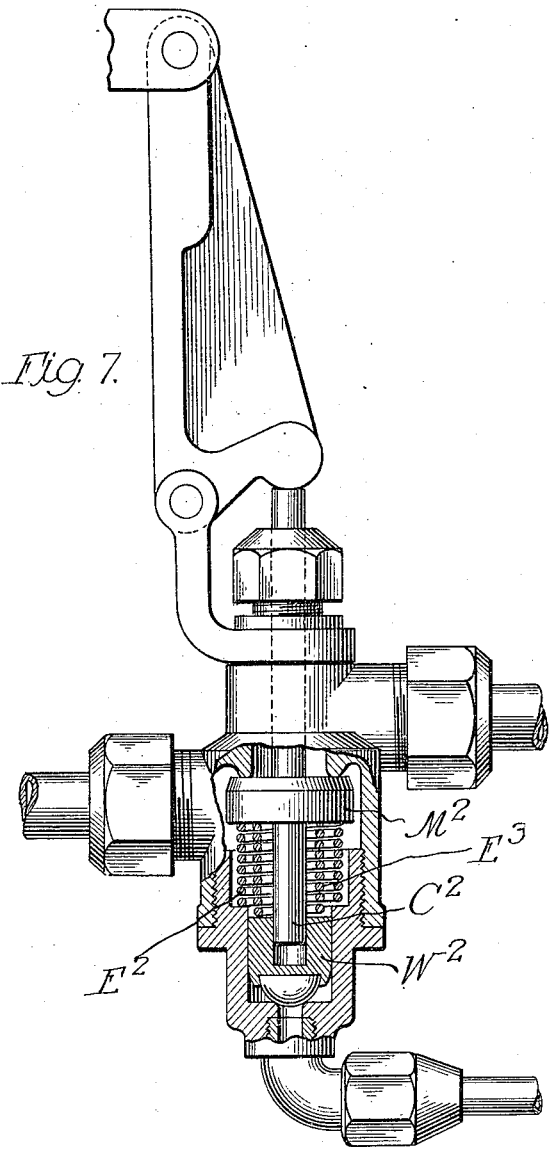
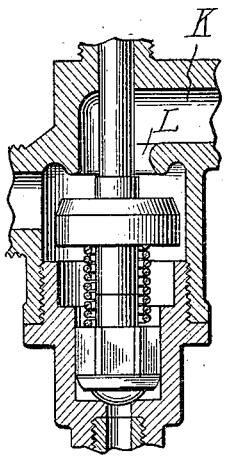
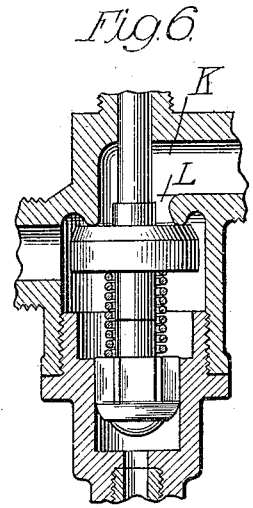
Inventor
Edward J. Thurber
John W. Racklyeft
By
Attorney
Witnesses

UNITED STATES PATENT OFFICE.

EDWARD J. THURBER, OF NEW ORLEANS, LOUISIANA, AND JOHN W. RACKLYEFT, OF DETROIT, MICHIGAN, ASSIGNORS, BY MESNE ASSIGNMENTS, TO NORTHERN ENGINEERING WORKS, OF DETROIT, MICHIGAN, A CORPORATION OF MICHIGAN.

VALVE MECHANISM.

1,271,805. Specification of Letters Patent. Patented July 9, 1918.

Application filed December 17, 1914. Serial No. 877,831.

*To all whom it may concern:*

Be it known that we, EDWARD J. THURBER, a citizen of the United States of America residing in New Orleans, parish of Orleans, State of Louisiana, and JOHN W. RACKLYEFT, a citizen of the United States of America, residing at Detroit, Wayne county, and State of Michigan, have invented certain new and useful Improvements in Valve Mechanism, of which the following is a specification, reference being had therein to the accompanying drawings.

The invention relates to valve mechanisms and resides in the novel construction, arrangement and combination of parts as will more fully hereinafter appear.

The improved valve is adapted for various uses, but as it is peculiarly useful in connection with an engine starting system employing a compressed fluid, it will be illustrated and described in connection with such a starter system, though it is not desired to limit the protection to this particular use.

In the drawings,—

Figure 1 is a diagrammatic illustration showing a starting system having the improvement applied thereto;

Fig. 2 is an enlarged vertical central section through the valve mechanism;

Fig. 3 is a section on the line 3—3 of Fig. 2;

Fig. 4 is a section on a line corresponding to 4—4 of Fig. 2 of a modified form;

Figs. 5 and 6 illustrate the valve parts in different positions of adjustments; and Fig. 7 is a side elevation partly in section, showing a slightly modified construction.

Referring to the structure illustrated in the drawings, A designates a starter of the compressed air type, A' the crank shaft of the engine to which the starter is connected, B the tank for compressed air and C a valve mechanism embodying the invention. D is a conduit leading from the tank B and connected by means of the valve mechanism C with a conduit E that leads to the rotor chamber F of the starter A. G is a conduit leading from the pump H of the starter to the valve mechanism C.

The casing I of the valve mechanism is provided with chambers J and K adapted to communicate by means of a port L that is controlled by a valve M. The latter is arranged within the chamber J and is adapted to engage a seat N formed on the inner face of the ported web O that separates the chambers J and K. P and Q are threaded nipples cast integral with the casing I and leading from the chambers J and K respectively. The nipple P is attached by a coupling S to the conduit D and the nipple Q is similarly connected to the conduit E. The portion of the chamber forming the casing J is open at the bottom, and arranged within the open end of the casing and having a threaded engagement therewith is a fitting R. This fitting is provided with a chamber T communicating with the chamber J and in reality forming a continuation thereof. The base of the chamber T has an apertured valve seat U that establishes communication between the chamber T and a nipple V which is connected to the conduit G, the latter as before stated, leading from the pump. W is a valve adapted to engage the seat U, the valve having a sliding movement with the lower portion of the chamber T, which as will be readily seen upon reference to Fig. 2, is of slightly less cross-section than the upper portion of this chamber. The lower portion of the chamber T—as shown in Fig. 3—has the inner wall X circular, while the sides Y of the valve W are polygonal, forming spaces Z to permit the compressed fluid to pass between the walls Y and X.

B' is a valve rod fixedly connected to, or cast integral with the valve M, and C' is an extension of the stem B' that projects below the member M. D' is a stem upon the valve W and E' is a coil spring sleeved upon the portions C' and D' and having the opposite ends abutting against the lower face of the valve M and the upper face of the valve W respectively. This spring normally acts to maintain both of said valves in engagement with their seats.

The upper end of the stem B' passes out through a bearing F' at the upper end of the casing I and is adapted to be engaged by a bell crank lever G'. The bearing F' is provided with a packing gland H' so as to prevent leakage around the stem B'. As shown, the portion F' is externally threaded, and upon this threaded portion is arranged an apertured arm I' of a bracket J'. K' is a nut for clamping the arm I' in place, and L' is an upwardly extending arm of the bracket J' to which the lever G' is pivoted at M'. The upper end of the lever G' is pivotally connected at N' to a rod or other connection O' that is attached to an operating lever or button P'.

When the parts of the valve mechanism are normal, the valves M and W are in the position shown in Fig. 2, and in this position the chamber J is in free communication with the tank and compressed air assists the spring E' in holding the valves to their seats. When it is desired to start the engine the operator depresses the pedal button P', which through the medium of the connection O' actuates the lever G' to cause the valve M to open. Upon the opening of the valve M compressed air or other fluid under compression in the tank B passes from the tank B by means of the conduits D and E and the valve casing to the rotor F setting the latter in operation. When the engine is started the operator releases the pedal P' and the valve M is closed by the spring E'.

It is desirable to have some means of ascertaining the pressure in the tanks B and we therefore provide the system with a gage Q' that is connected to the chamber J by means of a conduit R' that is attached to a nipple S' that is in open communication with the chamber J.

When the pressure in the tank falls the pump H is set in operation. Preferably the pump is manually controlled as by providing a suitable clutch mechanism adapted to be operated by a pedal lever T' and levers U', this clutch mechanism connecting the pump to the shaft A' so as to be driven therefrom, as will be readily understood. When the pump is in operation, as soon as the pressure in the conduit G is sufficient to overcome the tension of the spring E', compressed air enters the chamber J and flows through the conduit D to the tank B. Upon the opening of the valve W the spring E' is compressed, as shown in Fig. 6, and therefore acts to tightly press the valve M to its seat. Also the compressed air from the chamber J will assist in holding this valve closed. When the compressed air in the tank B reaches a predetermined pressure, as indicated by the gage Q', the operator disconnects the pump from the shaft A', the valve W automatically closing.

The spring E' upon the opening of the valve M is also compressed, as shown in Fig. 5, and therefore this spring—as will be readily apparent upon reference to Figs. 5 and 6—not only normally holds the valves M and W to their seats, but upon the opening of either valve, adds greater force to retain the other valve in engagement with the seat.

In order that compressed air in the tank B may be utilized for filling tires, we provide the conduit R' with a fitting V' to which is adapted to be attached a flexible conduit or the like, for filling the tires. The tire-inflating operation may therefore be performed without affecting the pump or the starting mechanism. If desired the chamber J may be provided with a check-controlled nipple A² for providing an escape for the compressed air in case the operator fails to uncouple the pump H from the shaft A' when the predetermined pressure has been reached.

In use it has been found that water will condense in the pipe lines between the pump and the reservoir, and also that some oil collects therein. Upon the operation of the pump this oil and water collects in the chamber T, but upon the opening of the valve M the compressed air will blow out all the oil and water that has collected in the chamber T through the pipe E into the rotor, from which it discharges to the atmosphere. This keeps the chamber T comparatively free from any water of condensation or oil.

In Fig. 7 there is shown a slightly modified construction in which the valve W² slides down and is governed by an extension C² of the valve M². E² is a coil spring acting upon the valve M² to retain it to its seat, while a separate coil spring E³ is employed for holding the valve W² to its seat. The remaining parts of this structure are the same as described in connection with the arrangement shown in Figs. 1 to 6 inclusive.

If desired a safety valve $a$ may be employed, this valve as shown in Fig. 4, communicating with the chamber J. When the pressure in the tank B reaches a predetermined point, if the operator does not disconnect the pump, the valve $a$ will be automatically opened against the tension of the spring $b$ and prevent an excess of pressure in the tank B. The spring $b$ is of course, of such a tension that it will hold the valve $a$ to its seat until a predetermined pressure has been reached. The safety valve may of course, be omitted from the system or applied thereto as desired.

What we claim as our invention is:—

A valve mechanism comprising a casing having opposed ports, valves respectively controlling said ports, a spring interposed between said valves tending to normally maintain the same closed, another spring abutting at one end against one of said valves and abutting at its other end against the casing, and means for manually controlling the valve against which both springs abut.

In testimony whereof we affix our signatures in presence of witnesses.

EDW. J. THURBER.
JOHN W. RACKLYEFT.

Witnesses:
SOLOMON WOLFF,
MILDRED M. PENDERGAST,
ADELAIDE I. ADALIS,
J. S. MURRAY.

Copies of this patent may be obtained for five cents each, by addressing the "Commissioner of Patents, Washington, D. C."